United States Patent [19]

Yamazaki et al.

[11] 4,312,895
[45] Jan. 26, 1982

[54] METHOD FOR PREPARING WATER-SOLUBLE LACQUER

[75] Inventors: Hitoshi Yamazaki; Hiroshi Ito; Toshiyuki Takeda, all of Kamakura; Junzo Enomoto, Amagasaki, all of Japan

[73] Assignee: Mitsubishi Denki Kabushiki Kaisha, Tokyo, Japan

[21] Appl. No.: 230,881

[22] Filed: Feb. 2, 1981

Related U.S. Application Data

[62] Division of Ser. No. 85,314, Oct. 16, 1979, Pat. No. 4,272,421.

[51] Int. Cl.³ .......................... B05D 7/22; C08L 71/02
[52] U.S. Cl. ............................. 427/67; 260/29.2 EP; 427/64; 427/157; 521/28; 528/482
[58] Field of Search ................ 260/29.2 EP; 427/157, 427/67; 528/482; 521/28

[56] References Cited

U.S. PATENT DOCUMENTS 3,462,379  8/1969  Gurgiolo et al. ................... 528/499
4,098,990  7/1978  Lutze et al. .......................... 528/499

FOREIGN PATENT DOCUMENTS 1441900  7/1976  United Kingdom .

*Primary Examiner*—Theodore E. Pertilla
*Attorney, Agent, or Firm*—Wenderoth, Lind & Ponack

[57] ABSTRACT

This invention relates to a method for preparing a water soluble lacquer, which comprises dissolving polyethylene oxide having a molecular weight of at least 2,500,000 in water to form a polyethylene oxide aqueous solution, adding acid to said solution in such a manner as to adjust the pH of the solution in the range of from 3.0 to 5.0, heating the resultant solution at a temperature of not lower than 95° C., cooling the solution and removing the remaining acid with an ion exchange resin.

2 Claims, No Drawings

METHOD FOR PREPARING WATER-SOLUBLE LACQUER

This application is a divisional of application Ser. No. 85,314, filed Oct. 16, 1979, U.S. Pat. No. 4,272,421.

DETAILED EXPLANATION OF THE INVENTION

This invention relates to a method for preparing a water-soluble lacquer. More particularly, this invention relates to a method for preparing a water-soluble lacquer used in the preparation of a phosphor layer coated on the inside of an envelope.

Recently, in the production of an envelope having a phosphor layer on its inside, such as a fluorescent lamp, mercury lamp and the like, the phosphor layer is formed on the inside of the glass envelope using a method which comprises preparing a phosphor suspension by dispersing phosphor powder in a water-soluble lacquer obtained by dissolving a water-soluble high molecular material in water as a binder, coating said phosphor suspension on the inside of the glass envelope, drying said coating, and then heating the coated envelope in an oven to remove the high molecular lacquer material by burning.

The lacquer material used in this process must provide a satisfactory dispersibility of phosphor powder and a uniform adhesiveness to the glass surface when coated as the phosphor suspension, and also must be completely removed by burning. Examples of the conventional lacquer material having the above mentioned properties include hydroxyethyl cellulose, carboxymethyl cellulose and the like. However, although these materials provide a satisfactory dispersibility of phosphor powder and a uniform adhesiveness to a glass surface when dissolved in water and used as a lacquer, it is necessary to heat them at 600° C. or higher in order to completely remove the high molecular material by burning, thus the energy consumption in the heating oven becoming very high. For example, in the production of a fluorescent lamp, heat energy consumed in the burning step of the phosphor layer constitutes about 60% of all the energy consumed in the whole process, thus increasing the manufacturing cost. Accordingly, a lacquer using a material which can be removed by burning at a lower temperature is greatly in demand.

In view of the above demand, the present invention provides a lacquer using a material which can be completely removed by burning at a relatively lower temperature and which provides various properties required to form a satisfactory phosphor layer. Thus, an object of this invention is to reduce the manufacturing cost of fluorescent lamps and the like. According to the present invention, the method for preparing a water-soluble lacquer used in the production of a phosphor layer, which provides various properties required to form a satisfactory phosphor layer and which can be thermally decomposed at a much lower temperature as compared with the conventional lacquer, comprises dissolving polyethylene oxide in water, adding acid to the solution, heating the solution at a temperature of not lower than 95° C., cooling the solution and removing the remaining acid by an ion exchange resin.

Polyethylene oxide is a water-soluble high molecular material having the chemical formula, $HO-(CH_2CH_2O)_n-OH$. The molecular chain of this material is cut and decomposition starts rapidly at a temperature of about 200° C. This material is completely volatilized at a temperature of 350°–400° C. In view of these properties, it was heretofore tried to use this material as a lacquer material for forming a phosphor layer. However, this material was not practical to use as a lacquer for forming a phosphor layer because the viscosity when dissolved in water was not suitable for a phosphor layer forming lacquer. That is, polyethylene oxide has viscosity properties of a very high spinnability and non-Newtonian flow when dissolved in water, and therefore a lacquer comprising a suspension having phosphor powders dispersed in the polyethylene oxide solution provides a non-uniform phosphor powder coating on a glass surface and it is impossible to form a phosphor layer having a uniform thickness.

The present invention improves the above mentioned unfavourable viscosity properties of a polyethylene oxide aqueous solution in such a manner as to satisfy the conditions required for forming a favourable phosphor layer by adding acid to the polyethylene oxide aqueous solution and heating the solution.

The present invention is further illustrated by the following Examples which show a method for preparation.

EXAMPLE 1

3 kg of polyethylene oxide ("Polyox WSR 301" manufactured by Union Carbide Co.) having an average molecular weight of 3,500,000 was dissolved in 100 liters of water heated at 95° C. or higher while stirring. 30 cc of formic acid was then added to the solution while stirring for about 5 minutes and maintaining the temperature at 95° C. or higher. This solution had a pH of 3.1 and was then cooled and 3 liters of anion exchange resin was added to the solution and the solution was stirred for 1 hour. Thereafter, the anion exchange resin was removed by passing the solution through a Nylon shieve of 50 mesh. The polyethylene oxide solution thus prepared provided a satisfactory lacquer having favourable viscosity properties with no stringiness. 30 kg of phosphor powder was added to 50 liters of the lacquer thus prepared, and the resultant mixture was stirred to form a phosphor suspension. Each of the phosphor suspensions thus prepared was flow-coated on the inside of a glass envelope of a 40 W fluorescent lamp, and dried in the same manner as the conventional techniques. A satisfactory phosphor coating was thus formed as uniform as in the case of the conventional hydroxyethyl cellulose or carboxymethyl cellulose lacquer.

EXAMPLE 2

A phosphor suspension was prepared in the same manner as in Example 1, except that 60 cc of acetic acid was used in place of 30 cc of formic acid. The solution had a pH of 4.0.

EXAMPLE 3

A phosphor suspension was prepared in the same manner as in Example 1, except that 2.5 kg of polyethylene oxide ("Polyox Coagurant" manufactured by Union Carbide Co.) having an average molecular weight of 4,500,000 was used in place of 3 kg of polyethylene oxide ("Polyox WSR 301") having an average molecular weight of 3,500,000 and that 20 cc of formic acid was used in place of 30 cc of formic acid. The solution had a pH of 3.3.

Each of the above coated glass envelopes was heated at 400° C. by being passed through an oven to decompose and remove polyethylene oxide. 40 W fluorescent lamps were produced using each of the above prepared glass envelopes in the same manner as the conventional techniques. Brightness and other properties of the lamp of this invention were substantially the same as those of the conventional ones. The gas consumption of the heating oven to remove the lacquer material was reduced by about 40% as compared in the conventional case.

That is, in the case of the conventional lacquer, it is necessary to heat at 600° C. or higher to remove the lacquer material remaining in the phosphor coating by burning, while in the case of the lacquer of this invention, it is sufficient for removing the lacquer material by burning to heat at a temperature of up to 400° C. Thus, heat energy (gas consumption) consumed in the heating oven is greatly reduced in the case of this invention.

In the above Examples, polyethylene oxides having average molecular weights of 3,500,000 and 4,500,000 were used respectively, but any polyethylene oxide can be used if it has an average molecular weight of at least 2,500,000. Polyethylene oxide having an average molecular weight of less than 2,500,000 is not preferable since the viscosity of the lacquer having the same concentration becomes lower. In the above Examples, formic acid and acetic acid were used as acid, but the same effect can be achieved by using any other acid, provided that it is added in such a manner as to adjust the pH in the range of from 3.0 to 5.0. At a pH of higher than 5.0, the viscosity properties of the polyethylene oxide solution do not change substantially, while at a pH of lower than 3.0, the lacquer prepared becomes unstable. It was proven that the heat treatment after the addition of acid should be conducted at a temperature of not lower than 95° C. That is, at a temperature of lower than 95° C., the viscosity properties do not substantially change, while the viscosity properties change rapidly at 95° C. or higher. In the above Examples, polyethylene oxide was dissolved in previously heated water, but polyethylene oxide may be dissolved in water at room temperature and the solution may be heated to the heat treatment temperature. As explained above, this invention comprises dissolving polyethylene oxide having a molecular weight of at least 2,500,000 in water to form a polyethylene oxide aqueous solution, adding acid to the solution, heating the solution at a temperature of not lower than 95° C., cooling and removing the remaining acid with an ion exchange resin. The water soluble lacquer thus prepared maintains favourable properties required for a lacquer for forming a phosphor layer, and the lacquer material of the lacquer of this invention can be removed by burning at a lower temperature than in the case of the conventional lacquer, thus greatly reducing the manufacturing cost of the envelope of a fluorescent lamp.

What we claim is:

1. In the method for the formation of a glass envelope having a phosphor layer on the inside surface thereof which comprises coating the inside surface of a glass envelope with a liquid phosphor suspension, drying said coating and heating the coated envelope, the improvement according to which the liquid phosphor suspension is formed by dissolving polyethylene oxide having a molecular weight of at least 2,500,000 in water to form a polyethylene oxide aqueous solution, adding acid to said solution in such a manner as to adjust the pH of the solution in the range of from 3.0 to 5.0, heating the resultant solution at a temperature of not lower than 95° C., cooling the solution and removing the remaining acid with an ion exchange resin and admixing phosphor powder with the solution resulting from removing the acid.

2. A liquid phosphor suspension which comprises a mixture of phosphor powder and a water soluble lacquer produced by the process which comprises dissolving polyethylene oxide having a molecular weight of at least 2,500,000 in water to form a polyethylene oxide aqueous solution, adding acid to said solution in such a manner as to adjust the pH of the solution in the range of from 3.0 to 5.0, heating the resultant solution at a temperature of not lower than 95° C., cooling the solution and removing the remaining acid with an ion exchange resin.

* * * * *